Figure 1:
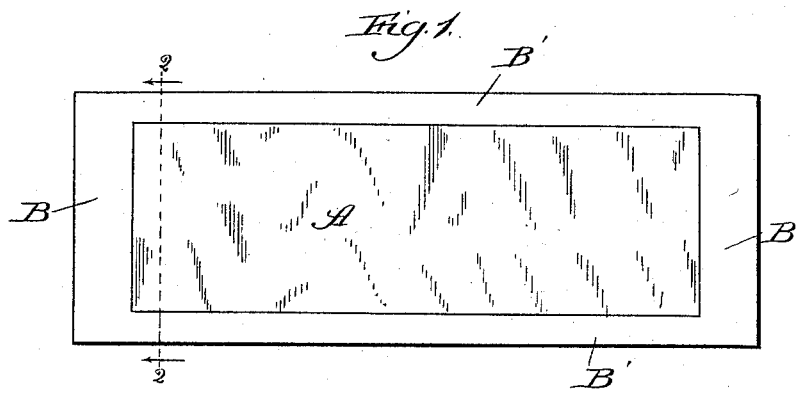

(No Model.)

J. DALE.
MANUFACTURE OF ELECTROTYPE OR STEREOTYPE PLATES.

No. 395,488. Patented Jan. 1, 1889.

Witnesses:
Chas. E. Gaylord.
J. W. Dyrenforth.

Inventor:
James Dale,
By Dyrenforth & Dyrenforth
Attys.

UNITED STATES PATENT OFFICE.

JAMES DALE, OF CHICAGO, ILLINOIS.

MANUFACTURE OF ELECTROTYPE OR STEREOTYPE PLATES.

SPECIFICATION forming part of Letters Patent No. 395,488, dated January 1, 1889.

Application filed February 16, 1888. Serial No. 264,282. (No model.)

*To all whom it may concern:*

Be it known that I, JAMES DALE, a citizen of the United States, residing at Chicago, in the county of Cook and State of Illinois, have invented a new and useful Improvement in the Manufacture of Electrotype or Stereotype Plates, of which the following is a specification.

My invention relates to an improved method of manufacturing electrotype or stereotype plates to adapt them to the curved surfaces of the parts of printing-machines to which they are to be applied. The printing-machines referred to may be cylinder-presses for job, newspaper, or color printing and the like, or machines for printing wall-paper, cloth, &c.

An obstacle in the way of employing electrotype or stereotype plates in printing-machines having curved or cylindrical surfaces on which to support the forms has consisted in the difficulty of shaping the plates to cause them to conform accurately to the curved supporting-surfaces, and without mashing the type or face, the bending of a plate (as commonly practiced by suitable machinery—*i. e.*, between rollers) producing tangential ends, which have to be bent to curve them into continuations of the arc described by the intermediate portion. As the bending of the tangential ends has to be performed by hand, the operation is attended with difficulty and produces unsatisfactory results in the form of uneven curves in the plates, which thus fail to fit with the necessary accuracy the curved supporting-surfaces. This difficulty is overcome by making the flat electrotype or stereotype plate as much longer or wider, according to whether the bend is longitudinal or transverse of the plate, on opposite sides of the type or face portion than the form is required to be, as is necessary to make the tangential ends equal or substantially equal in width to the excess of the width or length of the plate over that required for the form, and then, after the bending operation, cutting off the tangential ends. As the printing-surface of the plate is uneven, presenting as it does elevations and depressions in the bending, the spaces on the surface of the plate between the type are liable to "buckle," as it were—that is to say, owing to the depressions in the surface the strain of the bending operation tends to buckle the plate at the intervening spaces and thus produce lines of the type which incline toward each other and from the respectively adjacent lines, thereby causing lack of evenness in the surface of the material upon which impression is taken from the form, and, besides, destroying the true curve of the plate. I overcome this difficulty by filling in the spaces or thin parts between the type on the plate with a suitable substance as pliable or substantially so as the material of which the plate is formed, whereby, for the purpose of the bending operation, there are no spaces between the type, and consequently there is no buckling tendency.

In the accompanying drawings, I indicates the various steps of my improved method, which admit readily of illustration.

Figure 2:
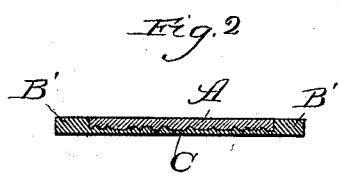
Figure 3:
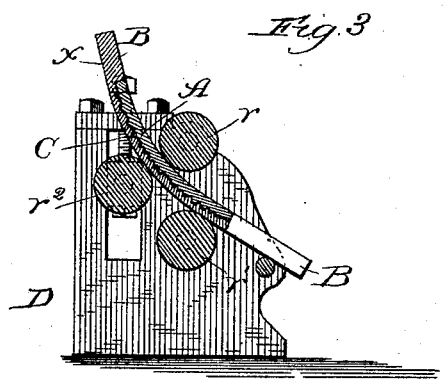
Figure 4:
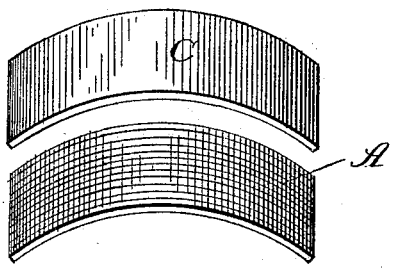

Figure 1 represents in rear plan view an ordinary electrotype or stereotype plate in a cap of pliable material covering the type-surface and edges of the plate. Fig. 2 is a section taken on the line 2 2 of Fig. 1 and viewed in the direction of the arrows. Fig. 3 shows a bending-machine in sectional elevation with the plate prepared with the cap, as shown in the preceding figures, undergoing the bending operation, a portion of the cap being broken away and the remainder thereof and the portion of the plate presented to view being shown in section; and Fig. 4 is a perspective view of the plate after being curved by the bending-machine and finished, and showing the cap, also in perspective, removed.

To practice my improved method, I proceed as follows: An electrotype or stereotype plate, produced in the common or any manner, is placed flatwise, with the face or type portion up, into a shallow pan—such as the ordinary electrotyper's pan—of suitable dimensions, and molten metal (preferably a mixture of tin and lead) is poured into the pan until the upper surface of the plate is completely covered to a desired depth—say to about three-sixteenths of an inch—and allowed to cool. The coated surface is then shaved to smoothen it and render it even, or substantially so, throughout and produce a uniform thickness. When prepared as thus described, the article appears as shown in Fig. 1, which presents to view the under side.

A is the electrotype or stereotype plate, and B and B', respectively, the end and lateral edges or portions which extend beyond and over the edges of the plate of the cap portion C, which edges B and B' unite with or adhere to the metal forming the body of the plate. For an electrotype-plate the metal used for forming the cap must be such as will not in its molten condition injure the copper of the type-face; and if molten metal be applied to a stereotype-plate to "cap" it the type-surface may be coated with a suitable substance to protect it against the injurious effect which the molten metal might otherwise have. It is not, however, necessary that the cap be formed of metal, since other substances which will afford the desired protection to the type-face against the mashing tendency of the bending-operation and bend with sufficient readiness—such as pulp, rubber, and the like—may be used; but I prefer metal, and particularly lead, or a suitable metal compound containing lead.

The length, in the direction of the curve to be produced, of the plate to be bent may correspond exactly with the length thereof desired for use in printing when the excess of length to be taken up by the tangential ends produced by the bending, and which are subsequently cut off, may be provided by the end or edge portions, B, of the cap C; or, if desired, the body of the plate may itself extend from the opposite extremities of the type thereon sufficiently far to produce the tangential edges to be cut off, when the opposite ends of the pan or confines therein for the corresponding ends of the plate should be just about far enough apart to admit the latter between them. In the latter case the cap C would have only lateral edges B' at which it would adhere to the corresponding edges of the body or lead portion of the plate. The plate A, with its cap C, in the form illustrated in Fig. 1, or with the cap extending only over the lateral edges of the plate, as last described, is then passed between the rollers $r$ and $r'$ of a suitable bending-machine, D, having an adjustable roller, $r^2$, for producing, by its proper adjustment, any desired degree of curve in the plate, and bent to concave the back of the plate and render convex the face or type-surface thereof, the capped surface being the one which is caused to come adjacent to the rollers $r'$ and $r^2$. The bending produces tangential ends or edges (such as the one shown at $x$ in Fig. 3) at opposite extremities, which ends are composed of the projecting end portions, B, of the cap C if the latter be formed to compensate for the extent of the plate which would have to be cut off if the body of the plate itself were of a length to allow for the portion in the form of tangential edges to be removed, as hereinbefore described. After being curved the sides B' (and, if provided, the ends B) of the cap C, which project over the corresponding edges of the plate A, are cut off or removed, thereby leaving the top portion of the cap, which does not unite with or adhere to the type-surface, but merely fills in the spaces thereof, free to be removed, as indicated in Fig. 4. It will thus be seen that by filling in the spaces between the type on the plate a practically uniform plate is subjected to the action of the bending-machine, whereby the curve between the unavoidable tangential edges is rendered even, and "buckling" is prevented between the surface-spaces.

The term "type" used in the foregoing description is intended to be sufficiently generic to include any surface presenting depressions and elevations, and from which an impression may be printed. As illustrated in Figs. 2 and 4, the depressions and elevations on the plate A represent a mere line-producing form.

Obviously, if the edges which become tangential by the bending are produced by the material forming the cap, as shown, there is no absolute necessity (though I prefer to do so) for having the lateral edges of the cap project over and beyond those of the plate, as the holding effect of the cap on the plate may be sufficiently exerted at the ends of the latter by the extension afforded by the former.

While the bending-machine shown and described affords preferred means for curving the plate, I do not desire to be limited to the same, but intend that any suitable means for the purpose be included as within my invention.

What I claim as new, and desire to secure by Letters Patent, is—

1. The method of manufacturing a curved electrotype or stereotype plate, which consists in filling the spaces on the type-face of the flat plate and thus rendering the latter substantially uniform throughout, and then curving the plate, substantially as described.

2. The method of manufacturing a curved electrotype or stereotype plate, which consists in capping its flat type-surface and edges of the plate with a molten metal or the like, then, after the cap has become hard, passing the capped plate between bending-rollers, and finally removing the projecting edges of the cap to release the plate, substantially as described.

3. The method of manufacturing a curved electrotype or stereotype plate, which consists in capping its flat type-surface and edges of the plate with molten metal or the like, and having the article as much or substantially as much, longer in the direction of the curve on both sides of the latter as will equal the tangential edges produced by bending it, then passing it between bending-rollers, and finally removing the tangential edges and laterally-projecting edges of the cap and releasing the plate, substantially as described.

4. The method of manufacturing a curved electrotype or stereotype plate, which consists in placing a flat electrotype or stereotype plate of the size required for the form in a suitable pan, pouring upon it molten metal or the like to form a cap, C, extending beyond and over the sides and adhering to the body of the plate, and forming at the opposite ends adhering extensions B equal or substantially equal in width to the tangential edges to be produced by the bending, then passing the article thus produced between bending-rollers, and finally removing the tangential edges and lateral edges of the cap and releasing the plate, substantially as described.

JAMES DALE.

In presence of—
J. W. DYRENFORTH,
CLIFFORD N. WHITE.